United States Patent Office 3,087,005
Patented Apr. 23, 1963

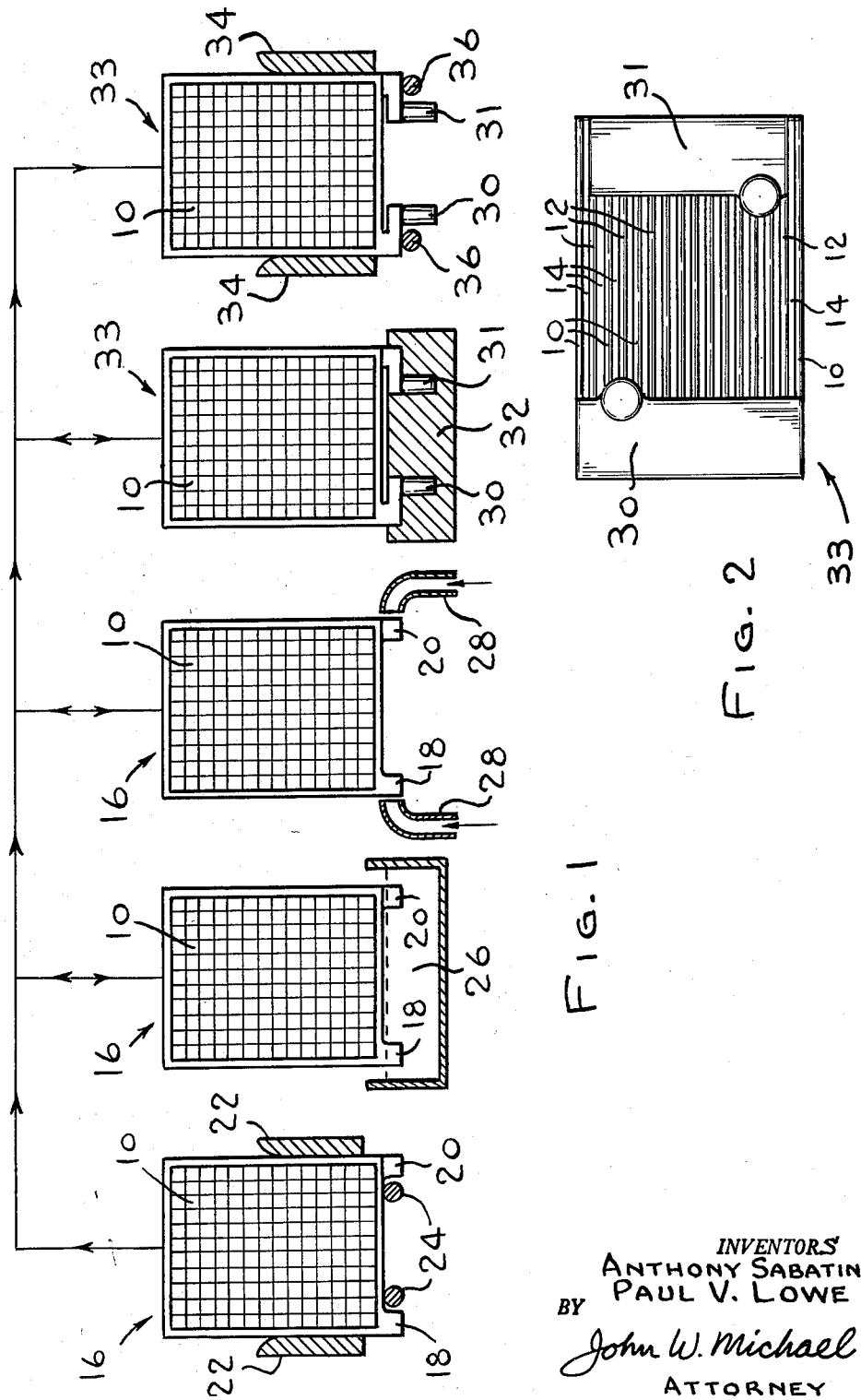

3,087,005
METHOD OF MAKING STORAGE BATTERY ELEMENTS
Anthony Sabatino and Paul V. Lowe, Milwaukee, Wis., assignors to Globe-Union Inc., Milwaukee, Wis., a corporation of Delaware
Filed May 18, 1959, Ser. No. 813,865
6 Claims. (Cl. 136—176)

This invention relates to improvements in the method of making an element of a storage battery.

Various methods have been used to make and assemble the post straps and plates of a storage battery stack to produce a finished element. One such method is to first cast the post strap and then weld it to the lugs on the plates by a burning operation. Another method generally referred to as the "cast-on" method combines the casting and welding steps by bringing the lead lugs of each plate group into contact with the molten lead in the mold. Despite the fact that the "cast-on" method has the advantage of eliminating the burning operation, the casting and burning method is currently in much wider use in the battery manufacturing industry. This is due to the difficulty of producing good welds between strap and plates with any degree of regularity with the "cast-on" method. Experience has proven that prior to our invention a fairly high percentage of satisfactory welds could be produced by the "cast-on" method only by first thoroughly cleaning the plate lugs immediately before welding and then performing the casting and welding operation within closely controlled temperature limitations. These requirements for the most part rendered the "cast-on" method commercially impractical with the result that at the present time the rather archaic casting and burning method is still predominant in the industry.

It is the object of this invention, therefore, to improve the "cast-on" method whereby proper fusion is regularly produced without extensive prior cleaning of the plates and/or the close maintenance of critical lead, mold and plate temperatures.

Another object is to provide an improved method, the steps of which are particularly well adapted for performance by automatic machinery.

These objects are attained by first stacking a plurality of positive and negative plates in alternate relationship with suitable separators between the plates. The plates and separators of the stack are then accurately aligned with the lugs on each group of plates positioned one behind the other. The next step is the application of a suitable flux to the lugs by lowering the stack into a flux bath to the extent necessary to wet the lugs. After the flux has been applied to the lugs they are preheated with hot air to drive off the flux solvent and activate the flux which, in turn, reduces part of the lead oxide on the lugs to free lead. The hot air also preheats the lugs prior to fusion.

The next step comprises the combined casting and welding operation wherein the positive and negative plate lugs are lowered into the still molten lead in the respective positive and negative mold cavities. The action of the hot lead on the fluxed lugs further activates the flux reducing any oxides left on the lugs. The active surface of the lug then fuses with the molten lead and any dirt still present floats to the surface. Sound, thoroughly fused welds are thus produced with a high degree of regularity.

Other objects and advantages will be pointed out in, or be apparent from the specification and claims, as will obvious modifications of the single embodiment shown in the drawings, in which:

FIG. 1 is a partially schematic flow diagram showing the various steps of the method embodying this invention; and FIG. 2 is a plan view of a finished storage battery element.

In the practice of our invention negative and positive plates 10 and 12, respectively, of conventional design are alternately arranged between suitable separators 14 to form a stack 16 with lugs 18 and 20 of the negative and positive plates, respectively, aligned with each other.

The first step after the plates and separators are properly stacked is to accurately align the stack. This can be done in any suitable manner such as that shown in the first step of the flow diagram (FIG. 1) wherein stack 16 is lowered between guides 22 (with lugs 18 and 20 extending downwardly) onto rods 24 which are then vibrated to insure proper alignment.

The next step is the application of a suitable flux to the lugs. Flux is applied by lowering stack 16 into a flux bath 26 to the extent necessary to wet lugs 18 and 20. Flux 26 may be of the acid type, rosin or resin type or organic type. While fluxes of all these types have provided results greatly superior to that of the prior art, it has been found that particularly good results are provided by the use of an active flux material made from a hydrazine salt. One such flux material which provides sound welds almost 100% of the time is a solution of hydrazine monohydrobromide in a suitable solvent such as alcohol or water. The use of a flux is essential to the successful performance of subsequent steps and it is this step which is primarily responsible for achieving the objects of this invention.

After the flux has been applied to the lugs they are preheated in any suitable manner such as by a stream of hot air delivered by conduits 28 as shown. The preheating step not only drives off the flux solvent but also serves to activate the flux which reduces part of the lead oxides present on the lugs to free lead and activates the lug surfaces. The hot air also preheats the lugs prior to the fusion. It has been found that preheat temperatures from 250°–500° F. are satisfactory with the specific temperature depending primarily on the percentage of active flux material in the solution and the type of solvent used.

The next step comprises the combined casting and welding operation wherein a negative post strap 30 and a positive post strap 31 are cast in a mold 32 and welded to lugs 18 and 20, respectively, of the plates. The preferred sequence for this combined operation is to first pour the lead alloy into the mold and immediately thereafter to make the welds by inserting lugs 18 and 20 of the plates into the molten lead. The flux on lugs 18 and 20 further reacts with the oxides on the lugs reducing them to free lead and the active surface of the lugs then fuses with the molten lead and any dirt still present floats to the surface. Well fused welds are thus regularly made between lugs and post straps.

While it is preferred that the pour be completed before the plates are lowered, fusion can be made by an alternative method wherein the lugs are first positioned in the mold cavities and then the molten lead is poured into the cavities around the lugs. We have found that the use of a molten lead temperature of 700°–1000° F., while maintaining a mold temperature of 200°–300° F., provides satisfactory results with either method.

The final step is the unloading of the completed element 33 from the apparatus used to perform the foregoing steps. Here again a pair of guides 34 and rods 36 can be used to support the finished element prior to unloading.

By following the steps outlined above it is possible to manufacture storage battery elements with virtually no rejects due to imperfect welds between plates and straps. This, it is noted, is accomplished without extensive precleaning of the lugs and without the maintenance of critical temperature conditions. Thus, for the first time, by the use of a suitable flux as outlined above, the "cast-on" method of casting and welding post straps to the plates of a stack has been successfully put into commercial practice.

It should be noted that in the performance of each of the steps described above and illustrated in FIG. 1, the stack 16 remains in the same relative position, i.e. with lugs 18 and 20 down. Thus, it is seen that the method of this invention is particularly well adapted for performance by automatic machinery where, for example, the aligned stack could be clamped to an overhead arm and moved to successive stations for the application of flux, pre-heating, welding, and unloading.

Although but one embodiment of the present invention has been illustrated and described, it will be apparent to those skilled in the art that various changes and modifications may be made therein without departing from the spirit of the invention or from the scope of the appended claims.

We claim:

1. In the cast-on method of welding a battery plate to a battery post strap which combines the steps of casting the strap and the welding of it to the plate by bringing the plate and strap into contact with each other while the strap is in a molten state in a mold comprising the separate steps of:

applying a flux to that portion of a battery plate which is to be contacted by the molten lead alloy strap and applying heat to said that portion of the plate to preheat such portion prior to the bringing of the fluxed portion and the molten strap into contact with each other.

2. The method of casting a battery post strap and welding it to a battery plate comprising the separate steps of:

applying a flux to a portion of a battery plate;

applying heat to the said portion of the plate to preheat such portion, drive off the flux solvent and activate the flux;

casting a post strap by introducing a molten lead alloy into a suitable mold;

and causing the fluxed portion of said plate to make contact with the lead in the post strap mold while the lead in the mold is still molten, said flux acting to reduce the oxides on the plate to thereby produce a well fused weld between the plate and the post strap.

3. The method of making an element for a storage battery from a plurality of alternately arranged positive and negative plates having lugs thereon comprising the separate steps of:

accurately aligning siad plates with each other;

applying a flux to the lugs of the plates by dipping the lugs in a flux bath;

applying heat to the lugs of the plates to preheat such lugs, drive off the flux solvent and activate the flux;

casting positive and negative post straps by introducing a molten lead alloy into suitable mold cavities;

and causing said plate lugs to make contact with the lead in the post strap mold cavities while the lead in the cavities is still molten, said flux acting to reduce the oxides on the lugs to thereby produce a well fused weld between the lugs and the post straps.

4. The method according to claim 3 in which the lugs are preheated by hot air to a temperature ranging from 250° to 500° F.

5. In the cast-on method according to claim 1 wherein said flux comprises an active flux material made from a hydrazine salt.

6. In the cast-on method according to claim 1 wherein said step of applying heat to said that portion of the plate includes the use of a stream of hot air directed toward said plate.

References Cited in the file of this patent

UNITED STATES PATENTS

| | | |
|---|---|---|
| 2,612,459 | Willard | Sept. 30, 1952 |
| 2,618,673 | Shannon et al. | Nov. 18, 1952 |
| 2,637,759 | Shannon | May 5, 1953 |
| 2,875,514 | Doerr | Mar. 3, 1959 |
| 2,886,622 | Shannon | May 12, 1959 |